Sept. 7, 1948. E. A. GLYNN 2,448,881
MULTIPLE JAW CHUCK
Filed May 31, 1946 2 Sheets-Sheet 1

INVENTOR
Edwin A. Glynn
BY
ATTORNEYS

Patented Sept. 7, 1948

2,448,881

UNITED STATES PATENT OFFICE 2,448,881

MULTIPLE JAW CHUCK

Edwin A. Glynn, Lodi, Calif., assignor to Super Mold Corporation of California, Lodi, Calif., a corporation of California Application May 31, 1946, Serial No. 673,559

4 Claims. (Cl. 279—106)

This invention relates to the machine art, and is directed particularly to a multiple jaw chuck for boring mills.

One object of the invention is to provide a chuck for holding metal rings or the like which are of relatively large diameter and of relatively light material, and so applying the clamping pressure at a multiple number of points about the circumference of such rings as to prevent any distortion or fracture of said relatively light rings.

A further object of the invention is to provide a chuck in which the clamping pressure will be automatically eased in response to any expansion of the metal of the ring being machined due to the heat generated in the cutting action of the tool.

A further object of the invention is to provide a practical multiple jaw chuck, and one which will be exceedingly effective for the purpose for which it is designed.

These objects are accomplished by means of such structure and relative arrangement of parts as will fully appear by a perusal of the following specification and claims.

Figure 1:
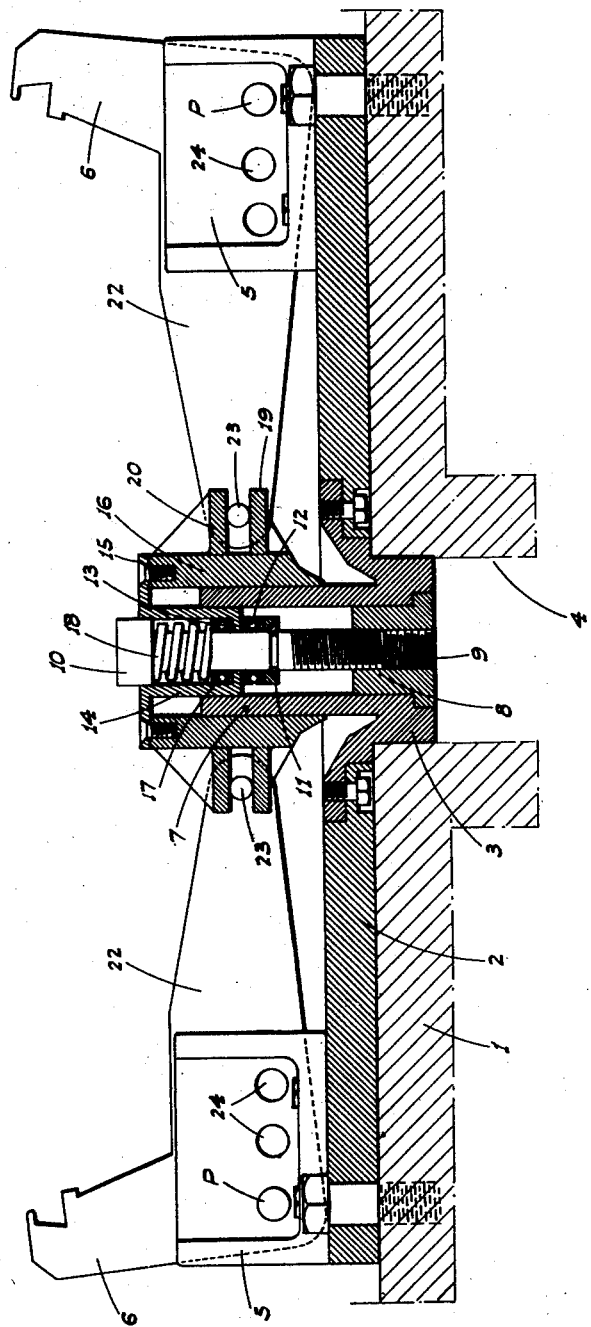
Fig. 1 is a transverse section through the improved chuck as it appears when mounted on the work table of the boring mill.
Figure 2:
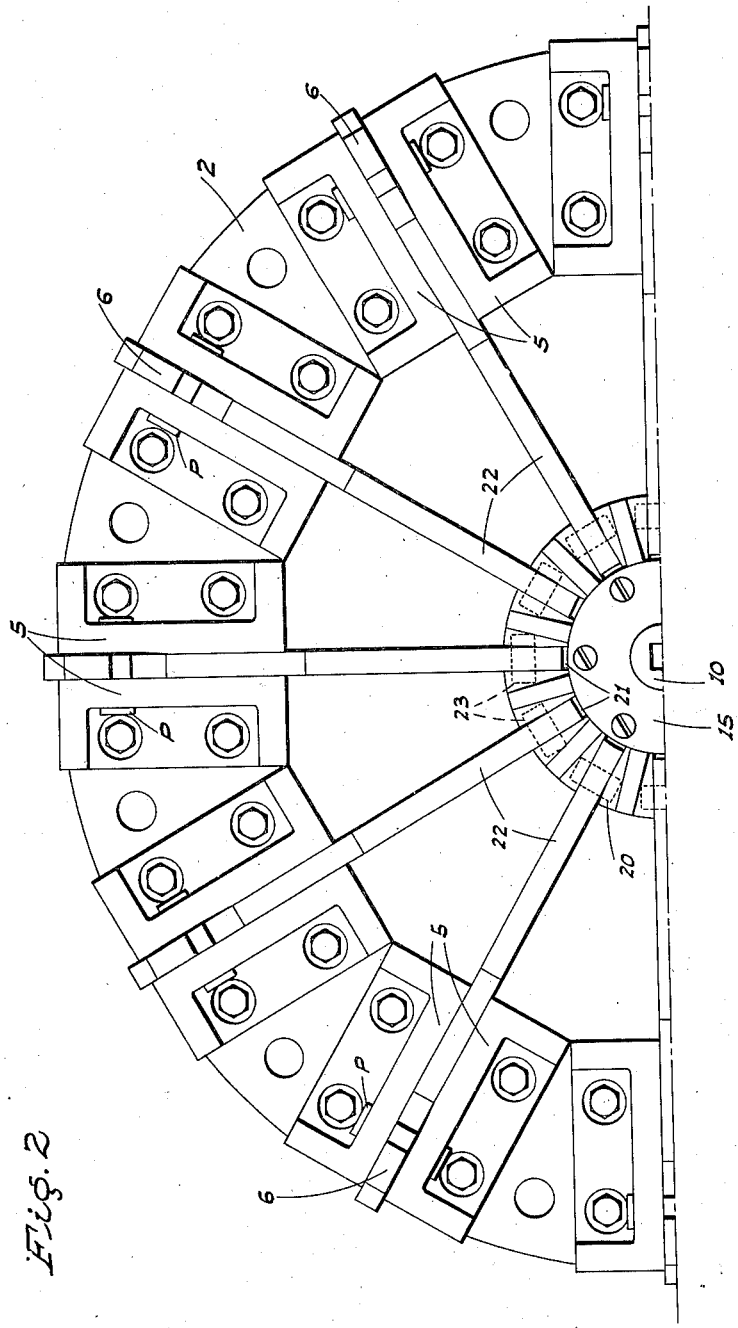
Fig. 2 is a top plan of one-half of the chuck.

Referring now more particularly to the characters of reference on the drawings, the numeral 1 designates the working bed of a boring mill or other machine on which the chuck is to be mounted. The chuck itself comprises a substantially circular base plate 2 which may be bolted or otherwise secured to the bed 1, and has a downwardly projecting collar 3 which fits into the central orifice 4 of the bed plate 1.

On the top face of the base plate 2, adjacent the outer circumference thereof, are a plurality of upstanding spaced supporting flanges 5, between each of which is pivotally mounted as at P, a work engaging jaw 6, which is of such configuration as to engage and clamp against the particular type of work which is to be interposed in the chuck, such jaws 6 being removably mounted between the flanges 5 for the purpose of interchangeability thereof.

Extending centrally up from the collar 3 is a sleeve 7, in the bottom of which is interposed a centrally threaded stud 8, into which is threaded from above a bolt 9 having a head 10. Turnably supported on the bolt 9, above the stud 8, is a collar 11, on which rests a ball bearing 12 which encircles the bolt 9. The bearing 12 supports a flange 13 projecting outwardly from a sleeve 14 having a top flange 15, depending from which is a sleeve 16. The sleeve 14 has a sliding fit on the inside of such sleeve 7. Around the bolt 9, above and resting on the flange 13, is another ball bearing 17, and interposed between this ball bearing 17 and the head 10 of the bolt 9 is a compression spring 18.

Surrounding the outer periphery of the sleeve 16, and as a rigid part thereof, are a pair of spaced annular flanges 19 and 20 having a plurality of alined radial cuts 21 therein, which cuts 21 are in radial alinement with the spaces between the flanges 5. On each jaw 6 is a projecting arm 22, each such arm projecting to a point in one of the cuts 21, and there being provided with a cross pin 23 extending between the flanges 19 and 20.

Fig. 1 shows the jaws 6 in their extended position and before the work is to be clamped therebetween, and it will be noted that the plurality of such jaws present a clamping means adaptable to engage a ring of very large diameter at a considerable number of points about the periphery thereof. The ring to be machined is usually machined to a true circle on that side which is to be engaged by the jaws 6. Such ring is then interposed within the circle of said jaws, and the bolt 10, through the medium of any proper tool, is screwed down to carry its threads through the threaded stud 8. This action presses against the compression spring 18, hence against the bearing 17, and flange 13. This action carries the sleeve 14, its flange 15, and the sleeve 16 downwardly. This action forces the pins 23, and consequently the outer ends of the arms 22, downwardly, and subsequently swings the jaws 6 inwardly on their pivots between the flanges 5, which action is continued until all the jaws are brought into contact with the work to be machined. It will thus be seen that by engaging the ring at the multiple number of points shown and through the action above described, a uniform clamping action is brought to bear against the ring at closely spaced points, so that during the machining thereof there will be little chance of distortion or fracture thereof due to the clamping action of the jaws.

The preferred use to which the invention has been put is that of machining aluminum rings for use in tire retreading molds, and it has been found that metal of this character tends to expand slightly when heated through the frictional action of the machining tool. Due to the large size of the rings this expansion may be of such an extent as to render the machining difficult or to tend to fracture the ring. However, due to the presence of the compression spring 10 in the organization, when such expansion occurs and the ring presses outwardly against the jaws, such action tends to raise the sleeves 16 and 14, and consequently the flange 13. Thereupon the spring 18 will compress just an amount necessary to compensate for such expansion of the metal, while at the same time holding the jaws in firm engagement with the ring.

It will be noted that each pair of flanges 5 has a horizontal row of holes 24 to receive the pivot pins P, so that jaws of different radial extent may be mounted in the chuck to accommodate work of considerably varying diameter.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from a spirit of the invention, as defined by the appended claims.

Having thus described the invention, the following is claimed as new and useful, and upon which Letters Patent are desired:

I claim:

1. A chuck comprising a base, a plurality of closely spaced jaws pivoted to the base about the outer periphery thereof, each jaw having an inwardly projecting arm, and means for exerting a down pressure on the inner ends of all the arms simultaneously; such means including an upstanding sleeve on the base, another sleeve slidable over the first named sleeve, means on said other sleeve pivotally connected with the ends of said arms, and means to advance and retract said other sleeve.

2. A structure as in claim 1 in which there is a yielding connecting between the two sleeves whereby to allow the jaws to spread apart in response to expansion of the work in the chuck due to heat generated therein during the machining operation.

3. A chuck comprising a base, a plurality of closely spaced jaws pivotally mounted about the outer periphery of the base, each jaw having an inwardly projecting arm, an upstanding sleeve disposed centrally of the base, a second sleeve slidable over the first sleeve, and being pivotally connected with the outer ends of said arms, a third sleeve fixed to the second sleeve, such third sleeve being slidable within the first sleeve, an inwardly projecting flange on the third sleeve, a bolt projecting through the third sleeve and being threaded into the bottom of the first sleeve, a collar on the bolt below said flange, and a ball bearing between the collar and flange.

4. A structure as in claim 3, and including a spring interposed between the head of the bolt and the bearing.

EDWIN A. GLYNN.

REFERENCES CITED

The following references are of record in the file of this patent:

UNITED STATES PATENTS

| Number | Name | Date |
|---|---|---|
| 1,022,761 | Stvanek | Apr. 9, 1912 |
| 1,239,873 | Bright | Sept. 11, 1917 |

FOREIGN PATENTS

| Number | Country | Date |
|---|---|---|
| 583,872 | France | 1925 |
| 648,028 | Germany | July 1937 |